(12) United States Patent
Ruiz

(10) Patent No.: US 7,593,188 B2
(45) Date of Patent: Sep. 22, 2009

(54) LOW PROTRUSION COMPENSATION AIR BEARING

(75) Inventor: Oscar Jaime Ruiz, San Jose, CA (US)

(73) Assignee: Hitachi Global Storage Technologies Netherlands, B.V., Amsterdam (NL)

(*) Notice: Subject to any disclaimer, the term of this patent is extended or adjusted under 35 U.S.C. 154(b) by 618 days.

(21) Appl. No.: 11/395,555

(22) Filed: Mar. 31, 2006

(65) Prior Publication Data
US 2007/0230050 A1 Oct. 4, 2007

(51) Int. Cl.
*G11B 5/60* (2006.01)
(52) U.S. Cl. ............... 360/128; 360/235.7; 360/234.7; 360/236.3
(58) Field of Classification Search ........... 360/128, 360/235.7, 234.7, 235.4, 235.5, 235.8, 235.9, 360/236.3, 236.5, 236.6, 236.7, 237
See application file for complete search history.

(56) References Cited

U.S. PATENT DOCUMENTS

| | | | |
|---|---|---|---|
| 4,605,977 A | | 8/1986 | Matthews |
| 4,669,011 A | | 5/1987 | Lemke |
| 5,886,856 A | | 3/1999 | Tokuyama et al. |
| 5,959,801 A | | 9/1999 | Gillis et al. |
| 5,991,113 A | | 11/1999 | Meyer et al. |
| 6,556,381 B2 | | 4/2003 | Kohira et al. |
| 6,690,543 B2 | | 2/2004 | Kurita et al. |
| 6,697,223 B2 | | 2/2004 | Lewis et al. |
| 6,798,605 B2 | | 9/2004 | Kurita et al. |
| 7,095,587 B2 * | | 8/2006 | Kurita et al. ............ 360/128 |
| 7,372,665 B1 * | | 5/2008 | Stoev et al. ........... 360/125.33 |
| 2002/0176208 A1 | | 11/2002 | Serpe et al. |
| 2003/0161070 A1 | | 8/2003 | Bonin |
| 2004/0201920 A1 * | | 10/2004 | Koide et al. ............. 360/128 |
| 2005/0207065 A1 | | 9/2005 | Takagi |
| 2005/0213250 A1 * | | 9/2005 | Kurita et al. ............. 360/234.4 |
| 2005/0270694 A1 * | | 12/2005 | Umehara et al. ........... 360/126 |

(Continued)

FOREIGN PATENT DOCUMENTS

EP 0 242 597 10/1987

(Continued)

OTHER PUBLICATIONS

Stokes, Magnetic Head with Piezoelectric Positioning, IBM Technical Disclosure Bulletin, p. 1429, Oct. 1973.

*Primary Examiner*—William J Klimowicz
(74) *Attorney, Agent, or Firm*—IPxLAW Group LLP; Claude A. S. Hamrick

(57) ABSTRACT

Magnetic head sliders having air-bearing surfaces designed to reduce the protrusion compensation effect. The magnetic head slider includes: at least one front pad located an upstream portion of the slider and operative to generate a lifting force; and a rear pad that is located downstream of the front pad and includes a load-carrying part, for generating a lifting force, and a head mounting part. The head mounting part is separated from the load-carrying part by a groove formed between the load-carrying part and the head mounting part. The head mounting part contains a heat source that generates heat energy and thereby causes a protrusion throw to form on the slider. The groove suppresses formation of the protrusion throw on the load-carrying part and thereby localizes the protrusion throw mostly in the area adjacent to the head mounting part.

13 Claims, 5 Drawing Sheets

U.S. PATENT DOCUMENTS

| | | | |
|---|---|---|---|
| 2006/0007594 A1* | 1/2006 | Umehara et al. | 360/126 |
| 2006/0034013 A1* | 2/2006 | Kato et al. | 360/128 |
| 2006/0245110 A1* | 11/2006 | Hanchi et al. | 360/234.7 |

FOREIGN PATENT DOCUMENTS

| | | |
|---|---|---|
| JP | 1216769 | 8/1989 |
| JP | 5020635 | 1/1993 |
| JP | 7235157 | 9/1995 |
| JP | 2002230930 | 8/2002 |
| JP | 2004241092 | 8/2004 |

* cited by examiner

12 # LOW PROTRUSION COMPENSATION AIR BEARING

FIELD OF THE INVENTION

The present invention generally relates to magnetic disk drive devices, and more particularly, to a magnetic head slider for use in a magnetic disk drive.

BACKGROUND OF THE INVENTION

In order to accommodate and increase the recording density of a magnetic disk drive device, it is important that flying height (or, equivalently magnetic spacing), that is defined as the spacing between a magnetic head mounted in a magnetic head slider and a rotating magnetic disk, is narrowed. An ideal magnetic head slider has a uniform and minimal flying height over the entire surface of the magnetic disk during operation. However, the flying height of a typical slider may have fluctuations caused by the variation of manufacturing tolerance, seek operations and ambient pressure change, such as a drop in atmospheric pressure when operating at a high altitude. Accordingly, some of the magnetic head sliders, referred to as high fliers, may have relatively larger flying heights than an intended average value.

To reduce the flying height of a high flier during operation and thereby to improve the quality of data communication between the magnetic disk and slider, a Thermal Flight Control (TFC) technique (or equivalently, Write Protrusion Control technique) may be used. The TFC technique controls the flying height by use of heat energy generated by heat generating element (or, equivalently, heat source) located adjacent to the writing or recording head. Typically, the heat generating element produces a protrusion throw with a large footprint, about 50 to 200 μm in diameter, wherein the protrusion throw refers to the deformation of the magnetic head slider surface due to the heat energy. The height of a typical protrusion throw ranges from 1 to 8 nanometers. When the heat generating element is activated, the protrusion throw decreases the magnetic spacing. However, the same protrusion interacts with the air flow beneath the slider surface and increases the magnetic spacing such that the reduction in magnetic spacing generated by the protrusion is diminished. This phenomenon is known as protrusion compensation effect and decreases the efficacy of the TFC technique. In general, low write protrusion compensation is desirable in terms of power consumption of the heat generating element.

A technical challenge to overcome in a typical low compensation design is the undesirable increase in flying height sigma, which is the standard deviation of a flying height distribution, particularly when the magnetic head slider flies at high pitch angles. In general, a large flying height sigma tends to offset the gains in magnetic spacing realized by the TFC technique. As the altitude sensitivity and flying height profile degradation of the slider are associated with the protrusion compensation as well as the flying height sigma, there is a strong need for a technique that can reduce the protrusion compensation effect without significantly increasing the flying height sigma.

SUMMARY OF THE INVENTION

The present invention provides magnetic head sliders configured to reduce the protrusion compensation effect. The magnetic head slider moves over a magnetic disk that can generate an air flow between the slider and disk during operation.

The magnetic head slider includes: at least one front pad formed on an upstream portion of the slider and operative to generate a lifting force by use of the air flow; and a rear pad that is located downstream of the front pad and along a longitudinal axis of the slider and includes a load-carrying part, for generating a lifting force, and a head mounting part that is separated from the load-carrying part by a groove formed between the load-carrying part and the head mounting part. The head mounting part contains a heat source that generates heat energy and thereby causes a protrusion throw to form on the slider. The groove suppresses formation of the protrusion throw on the load-carrying part and thereby localizes the protrusion throw mostly in the area adjacent to the head mounting part.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
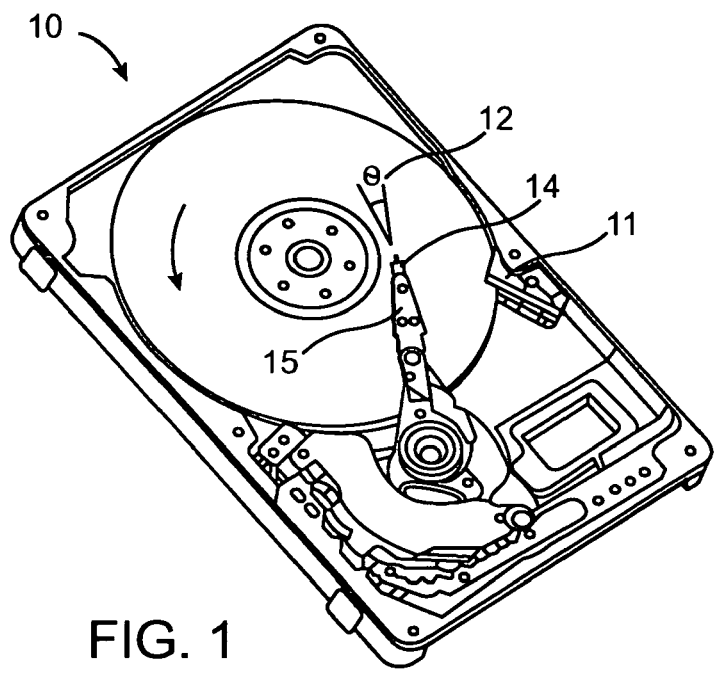
FIG. 1 is a perspective view of a magnetic disk drive device provided with a magnetic head slider in accordance with the present invention.

FIG. 1 is a perspective view of a magnetic disk drive device shown at 10 and provided with a magnetic head slider 14 of the present invention. The magnetic head slider 14 is attached to the distal end of a suspension mechanism 15 that unloads onto a ramp 11 while the magnetic disk device is stopped. When the magnetic disk device shown at 10 is in operation, the magnetic head slider 14 will be loaded over the magnetic disk 12 and the recording or the reproduction executed. Even though the disk drive 10 is shown as a load/unload type, it will be recognized by those of ordinary skill in the art that the present invention is adaptable to contact start/stop drives. Data tracks in the magnetic disk 12 and the longitudinal axis of the suspension mechanism 15 form a skew angle θ ranging from −16 to +16 degrees as the slider 14 moves across the magnetic disk 12 in the radial direction thereof.

Figure 2:
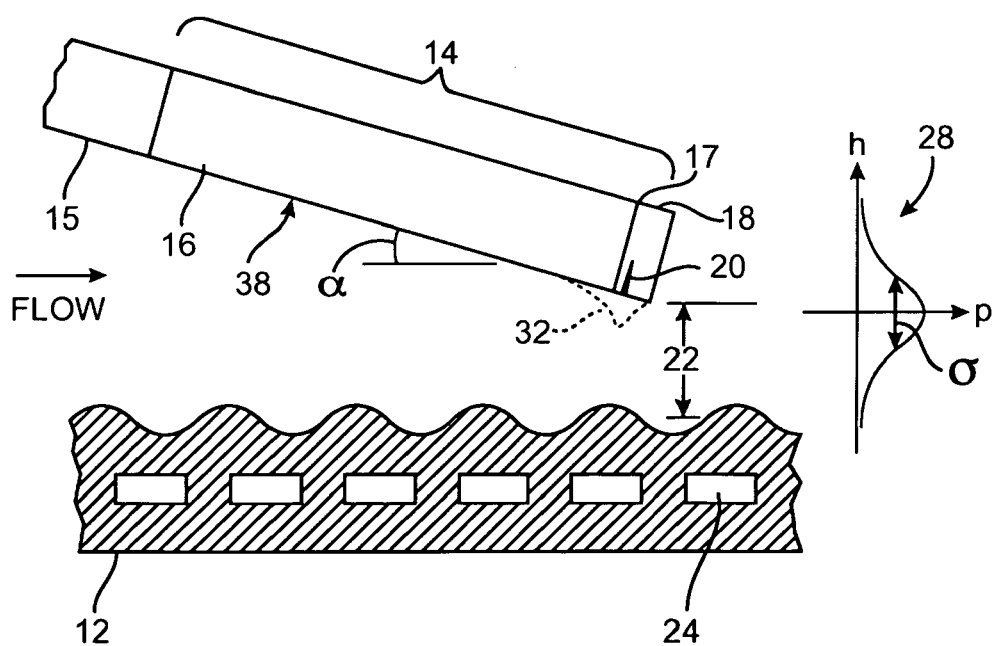
FIG. 2 is a partial side elevational view illustrating the relative position of the magnetic head slider with respect to the magnetic disk depicted in FIG. 1.

FIG. 2 is a partial side elevational view schematically illustrating the relative position of the magnetic head slider 14 with respect to the magnetic disk 12 depicted in FIG. 1. The slider 14 may include a first portion 16 and a second portion 18, which are preferably made of, but not limited to, intermetallic material (such as N58) and alumina, respectively. The magnetic head 20, which collectively refers to the reading/reproducing inductive head and writing head, is positioned in the second portion 18 and creates and interacts (writes and reads) with the data storage bits or elements 24 in the magnetic disk 12. The head 20 is separated from the top surface of the disk 12 by a distance 22, which is referred to as flying height or magnetic spacing and has a range of, but is not limited to, 10-20 nm.

When an airflow generated by the rotation of the magnetic disk 12 enters between the magnetic head slider 14 and the magnetic disk 12, pressure is generated therebetween, so that the magnetic head slider 14 begins to float off the surface of the magnetic disk 12. The magnetic slider 14 is designed to float with such an attitude that the flying height on the flow-in side is larger than the flying height of the flow-out side, i.e., the magnetic head slider 14 has a slight pitch angle a so that the head 20 is closer to the magnetic disk 12 during operation than is the remainder of the slider.

The graph 28 in FIG. 2 illustrates an exemplary probability distribution of the flying height (p-axis) as a function of the distance from the disk surface (h-axis). The flying height sigma a represents the standard deviation of the probability distribution. The factors affecting the magnitude of the flying height sigma a may include variation of manufacturing tolerance, seek operations and ambient pressure change, such as a drop in atmospheric pressure when operating at a high altitude.

As suggested by graph 28, some sliders have large flying heights and are referred to as high fliers. To reduce the flying height 22 during operation, the distal end portion of the slider 14 may be controlled by the Thermal Flight Control (TFC) technique (or equivalently, Write Protrusion Control technique). The writing element of the head 20 includes a coil for generating a magnetic field when recording data in the storage elements 24. The slider 14 includes a heat generating element or heat source (not shown in FIG. 2) located adjacent to the writing or reading element of the head 20. Hereinafter, for simplicity, the location of the head 20 is used to approximately represent the location of the heat generating element. When the heat generating element generates heat energy a portion of the slider 14 near the head 20 may become swollen to generate a protrusion throw 32. Typically, the protrusion throw 32 has a peak height of 1-8 nm near the head 20 and extends about 150 μm to the first portion 16 and about 45 μm to the second portion 18. The distance between the head 20 and the boundary 17 is about 2 μm. The TFC technique utilizes this protrusion throw 32 to in effect reduce the flying height 22. The protrusion throw 24 may also generate additional lifting force on the slider 24 diminishing the desired effect of protrusion throw 32, which is referred to as protrusion compensation effect.

In FIG. 2, the bottom surface 38 of the slider 14, referred to as an air-bearing surface, faces the disk 12 and is shown to have a flat surface for the purpose of illustration. However, when viewed in a micro scale, the air-bearing surface reveals a plurality of surface contour or constituents as illustrated in FIGS. 3-10.

Figure 3:
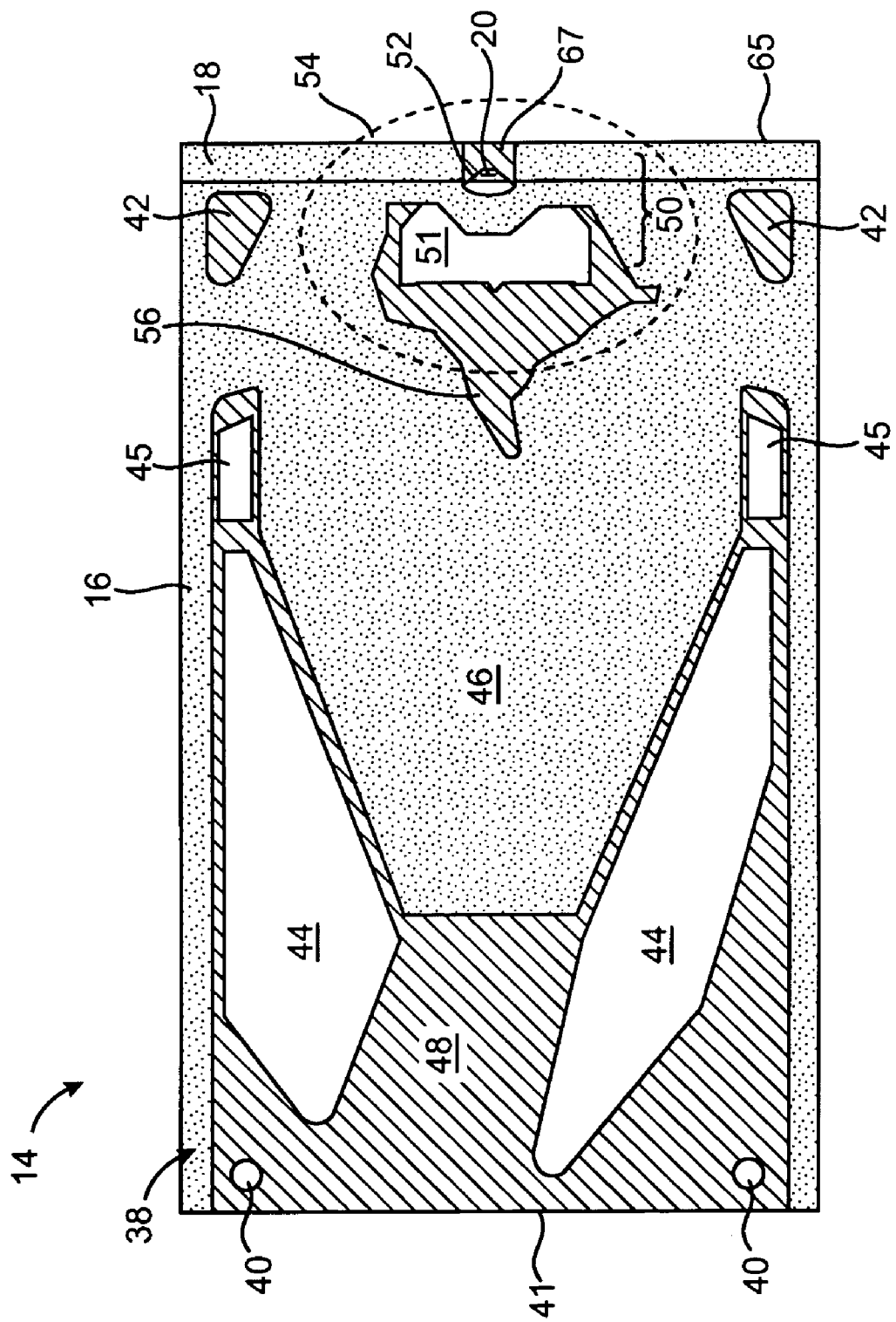
FIG. 3 is a bottom plan view of the magnetic head slider depicted in FIG. 1 according to one embodiment of the present invention.

FIG. 3 is a bottom plan view of the magnetic head slider 14 depicted in FIG. 1 according to one embodiment of the present invention. As illustrated, the air-bearing surface 38 of the slider 14 includes: a pair of front air-bearing pads 44 positioned near the flow-in or upstream edge 41 and including two trailing surface constituents 45; a first surface constituent 48 surrounding the front pads 44 and trailing surface constituents 45 and being operative to compress the air flowing from the flow-in edge side 41; a second surface constituent 46 for generating sub-atmospheric pressure thereon; a rear air-bearing pad 50 positioned near the air flow-out or downstream edge 65 and including a load-carrying part 51, for generating a lifting force, and a head mounting part 52, the head mounting part 52 being separated from the load-carrying part 51 and provided with a head 20; a third surface constituent 56 partially surrounding the load-carrying part 51; a pair of fourth surface constituents 40; and a pair of fifth surface constituents 42. The fourth and fifth surface constituents have smooth surfaces and prevent the other portions of the air-bearing surface 38 from scratching the top surface of the disk 12 during loading/unloading the suspension mechanism 15 from the load/unload ramp 11. The second surface constituent 46 is shaped to reduce the decrease of flying height caused by an atmospheric pressure drop when operation occurs in high altitude conditions.

The shape and depth of each surface constituent in the air-bearing surface 38 is determined to meet the design requirements, such as flying height uniformity across the radial direction of the disk, sensitivity of the flying height with respect to atmospheric pressure change, magnitude of the flying height sigma, fly height loss during track seek, fly height change during servo track writing, and dynamic stability of the slider. The front pads 44, load-carrying part 51, fourth surface constituents 40 and head mounting part 52 are formed at a first surface level positioned most closely adjacent to the magnetic disk 12. The first surface constituent 48, third surface constituent 56 and the fifth surface constituents 42 are formed at a second surface level further separated from the magnetic disk 12 than the first surface level. The second surface constituent 46 is formed at the third surface level even further separated from the magnetic disk than the second surface level. The slider 14 may further include a sixth surface constituent 67 located downstream of the head mounting part 52, wherein the sixth surface constituent may be formed at the second surface level.

Each of the first to third surface levels contains one or more surface constituents and has a preset amount of difference in depth with respect to its neighboring surface level. Each surface may have a slight variation in level or depth. For example, as the hardness of the base material (TiAlC) constituting the first portion 16 (FIG. 2) is different from that (alumina) of the second portion 18 having the magnetic head 20, the softer magnetic head will be abraded to a greater extent in a grinding or etching process during manufacturing, thereby forming a slight difference in level. However, such difference or variation of the level is not significant and, as such, each surface may be considered substantially flat.

Figure 4:
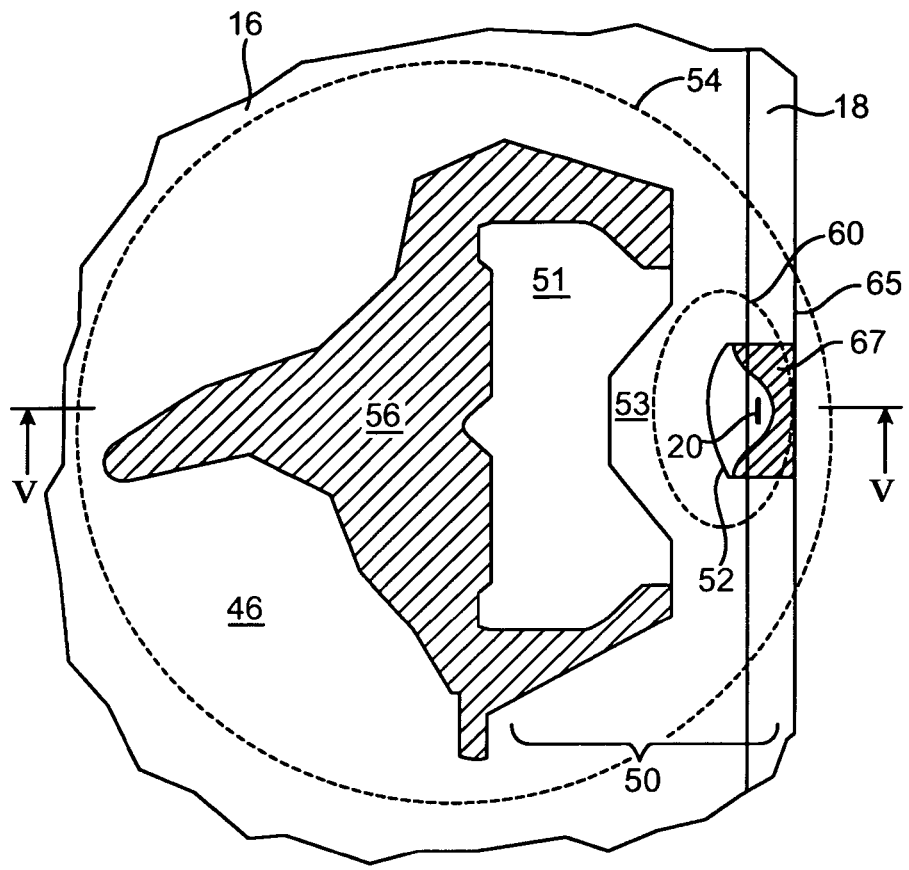
FIG. 4 is an enlarged view of the rear portion of a segment of the magnetic head slider depicted in FIG. 3.
Figure 5:
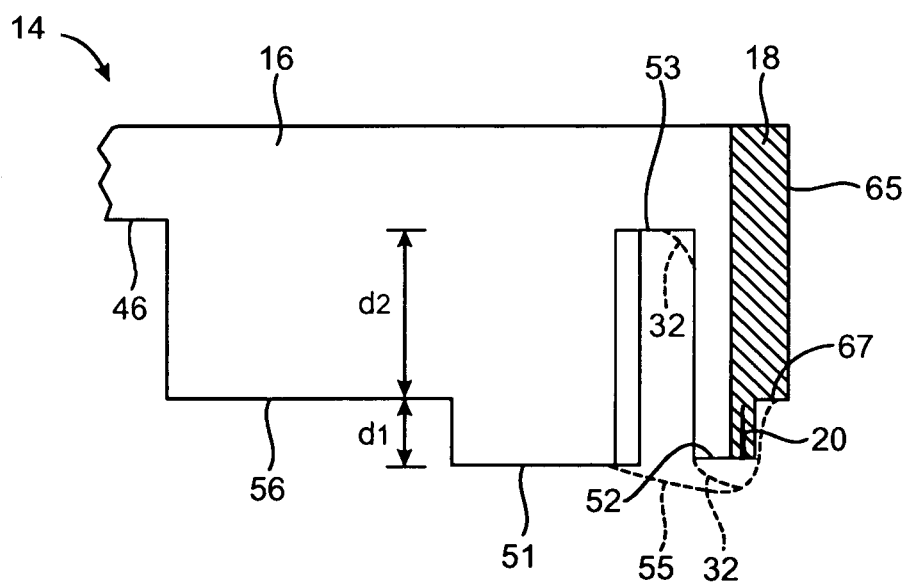
FIG. 5 is a cross sectional view of the rear portion depicted in FIG. 4, taken along the direction V-V.

It is noted that the head mounting part 52 is separated from the load-carrying part 51 to reduce the protrusion compensation effect. Further detailed description of the circled portion 54 containing the rear air-bearing pad 50 is given in connection with FIGS. 4 and 5. FIG. 4 is an enlarged plan view of the circled portion 54 depicted in FIG. 3, illustrating the load-carrying part 51 separated from the head mounting part 52 by a trench or groove 53. As discussed with reference to FIG. 2, the protrusion throw 32, generated by the heat generating element located adjacent to the head 20, has a footprint. In FIG. 4, the area 60 represents the footprint or a portion of the slider that may be affected and deformed by the heat energy generated by the heat generating element. To minimize the footprint and thereby to reduce the protrusion compensation effect, the head mounting part 52 is separated from the load-carrying part 51. By this separation, the deformation (or, equivalently, protrusion throw) may be localized mostly in the area adjacent the head mounting part 52, i.e., the load-carrying part 51 is much less affected by the heat energy generated by the heat generating element than the head mounting part 52. Also, the trailing edge of the load-carrying part 51 may be shaped to have a level approximately matching the outer boundary of the area 60. The head portion 52 may have a shape elongated along the direction transverse to the flow direction, and the length and width of the head portion 52 are about 25 μm and 70 μm, respectively. It is noted that the size of the area 60 may change according to the amount of the heat energy, and in some cases, may extend to the load-carrying part 51.

FIG. S is a cross sectional view of the circled portion 54 depicted in FIG. 4, taken along the direction V-V. As illustrated, the head 20 may be contained in the portion 18. Even though the detailed structure of and method for forming the portion 18 are not given, it should be apparent to those of ordinary skill that the portion 18 may be formed by a typical semiconductor manufacturing process, such as chemical etching, and include additional components related to the head 20. It is also noted that the trench or RIE groove 53 prevents the area 60 from growing toward the load-carrying part 51 and thus lowers the protrusion compensation effect. For example, the dotted line 55 would correspond to an imaginary protruding throw generated in the absence of the groove 53. In general, the protrusion compensation effect may decrease as the width of the groove 53 increases. The groove 53 may be contoured to approximately match the outer boundary of the area 60. As a consequence, the protrusion throw 32 is localized mostly in the area adjacent the head mounting part 52.

The depth d1 from the first surface level to the second surface level is about, but not limited to, 0.05-0.5 μm, and the depth d2 from the second surface level to the third surface level is about, but not limited to, 0.5 to 5 μm, respectively. As such, the depth of the groove 53 ranges from 0.55 to 5.5 μm and is preferably 1.5 μm. It is noted that the present invention could be practiced with any suitable range of the depths d1 and d2, and with any suitable dimension of the head mounting part 52. It is also noted that the depth of the groove 53 is same as that of the second surface constituent 46.

Figure 6:
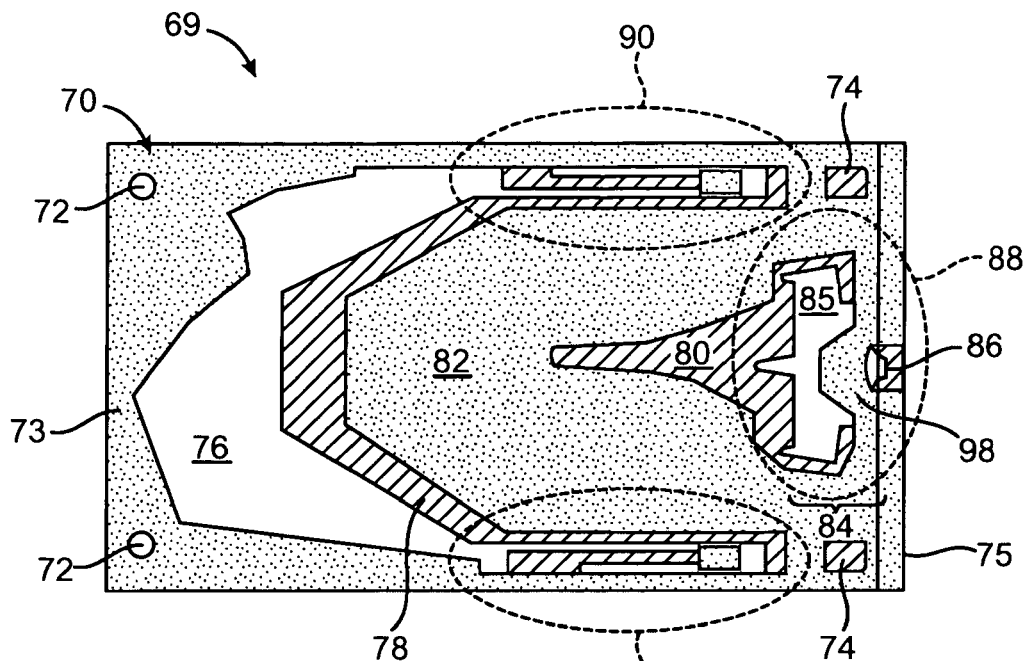
FIG. 6 is a bottom plan view of an alternative embodiment of the magnetic head slider depicted in FIG. 1.

FIG. 6 is a bottom plan view of an alternative embodiment 69 of the magnetic head slider 14 in FIG. 1, illustrating the air-bearing surface 70 of the slider. As depicted, the air-bearing surface 70 includes: a front air-bearing pad 76 positioned near the flow-in or upstream edge 73; a pair of side air-bearing pads 90 (detailed in connection with FIGS. 9 and 10) for increasing air-bearing stiffness; a first surface constituent 78 neighboring the front pad 76 and being operative to compress the air flowing from the flow-in edge side; a second surface constituent 82 for generating sub-atmospheric pressure thereon; a rear air-bearing pad 84 positioned near the air flow-out or downstream edge 75 and including a load-carrying part 85, for generating a lifting force, and a head mounting part 86 that is separated from the load-carrying part 85 and provided with a head (not shown in FIG. 6); a third surface constituent 80 partially surrounding the load-carrying part 85; a pair of fourth surface constituents 72; and a pair of fifth surface constituents 74. The fourth and fifth surface constituents have smooth surfaces and prevent the other portions of the air-bearing surface 70 from scratching the top surface of disk 12 during loading/unloading the suspension mechanism 15 from the load/unload ramp 11.

As in the case of the embodiment illustrated in FIG. 3, the shape and depth of each surface contour or constituent in the air-bearing surface 70 is determined to meet various design requirements, such as flying height uniformity across the radial direction of the disk, sensitivity of the flying height with respect to atmospheric pressure change, magnitude of the flying height sigma, fly height loss during track seek, fly height change during servo track writing, and dynamic stability of the slider. The front pad 76, load-carrying part 85, fourth surface constituents 72 and the head mounting part 86 are formed at a first surface level positioned most closely adjacent to the magnetic disk 12. The first surface constituent 78, third surface constituent 80 and the fifth surface constituent 74 are formed at a second surface level further separated from the magnetic disk 12 than the first surface level. The second surface constituent 82 is formed at a third surface level even further separated from the magnetic disk than the second surface level. The slider 69 may further includes a trailing surface constituent 97 located downstream of the head mounting part 86, wherein the trailing surface constituent may be formed at the second surface level.

Again, it is noted that the head mounting part 86 is separated from the load-carrying part 85 by trench or groove 98 to localize the protrusion throw in the area adjacent the head mounting part 86 and thereby to reduce the protrusion compensation effect. Further detailed description of the circled portion 88 containing the rear air-bearing pad 84 is given in connection with FIGS. 7 and 8.

Figure 7:
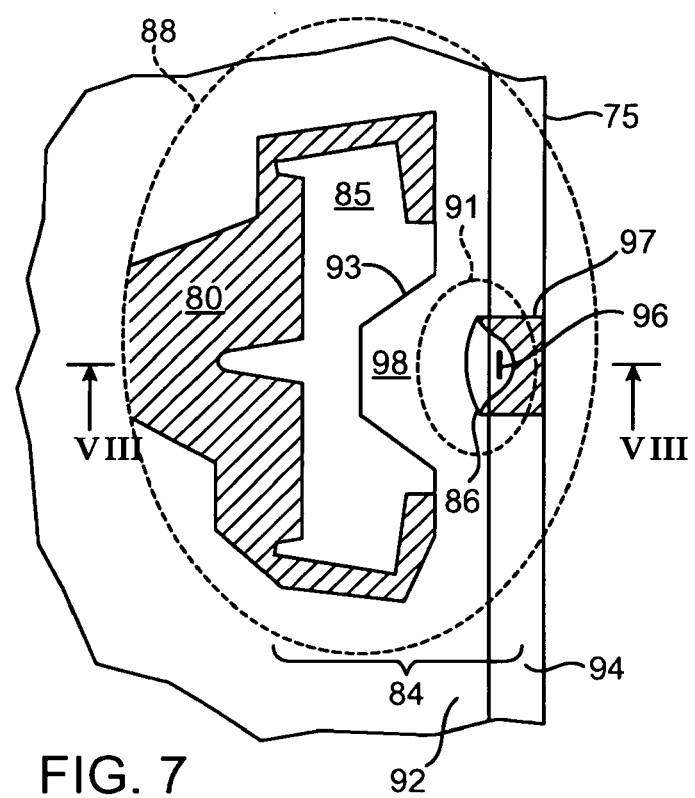
FIG. 7 is an enlarged view of the rear portion of a segment of the magnetic head slider depicted in FIG. 6.
Figure 8:
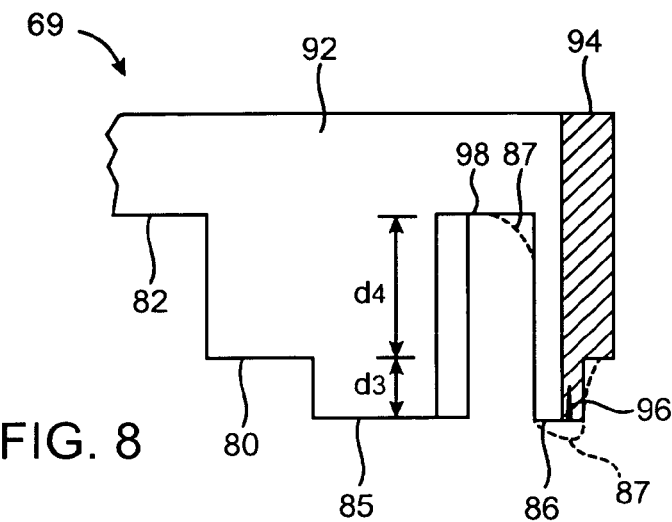
FIG. 8 is a cross sectional view of the magnetic head slider depicted in FIG. 7, taken along the direction VIII-VIII.

FIG. 7 is an enlarged plan view of the circled portion 88 of the magnetic head slider 69 depicted in FIG. 6, illustrating the head mounting part 86 separated from the load-carrying part 85 by the groove 98. FIG. 8 is a cross sectional view of the circled portion 88 depicted in FIG. 7, taken along the direction VIII-VIII. As discussed above, the protrusion throw 87 (FIG. 8), generated by a heat generating element located adjacent to the head 96 during the recording of data, may cause the protrusion compensation effect. The area 91 represents a footprint of the protrusion throw or a portion of the surface that may be affected by the heat energy generated by the heat generating element and become swollen. By separating the head mounting part 86 from the load-carrying part 85 by the groove 98, the deformation (or, equivalently, protrusion throw) 87 may be localized mostly in the area adjacent the head mounting part 86. The trailing portion 93 of the load-carrying portion 85 may be shaped to have a level approximately matching the outer boundary of the area 91.

As illustrated in FIG. 8, the structure of the circled portion 88 is similar to that of the circled portion 54 in FIG. 4. For instance, the depths d3 and d4 may have the same dimensions as d1 and d2, respectively, and the trench or RIE groove 98 separates the load-carrying part 85 from the head mounting part 86. For simplicity, the detailed description of the features shown in FIG. 8 is not repeated.

Figure 9:
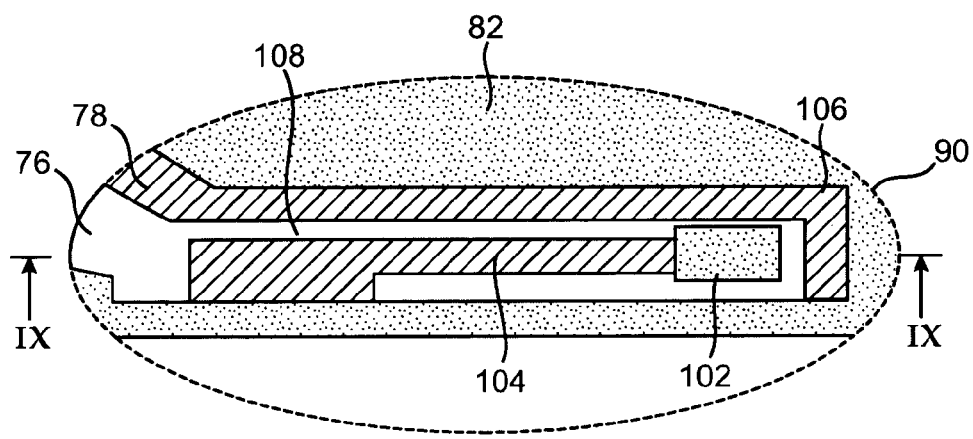
FIG. 9 is an enlarged view of a side air-bearing pad included in the magnetic head slider depicted in FIG. 6.

As depicted in FIG. 1, the data tracks on the disk 12 and the longitudinal axis of the slider 14 form a skew angle ranging from −16 to 16 degrees as the slider 14 moves across the magnetic disk 12 in the radial direction. This variation of the skew angle may generate a non-uniform distribution of rolling moment across the radial direction of the magnetic disk 12. In addition, a seek motion along the radial direction may cause an undesirable rolling moment. To increase the air-bearing stiffness and thereby to reduce variation of the rolling moment, a pair of side air-bearing pads may be used as illustrated in FIG. 6. FIG. 9 is an enlarged view of one of the side air-bearing pads 90 included in the magnetic head slider 69 of FIG. 6. As illustrated, each side air-bearing pad 90 includes: a sixth surface constituent 102 having a generally rectangular shape; a seventh surface constituent 104 having a substantially polygonal shape with an elongated portion, a tip of the elongated portion being in contact with the sixth surface constituent 102; a tail 108 of the front pad 76 partially surrounding the sixth surface constituent 102 and the seventh surface constituent 104; and a tail 106 of the first surface constituent 78 partially surrounding the tail 108 of the front pad 76.

Figure 10:
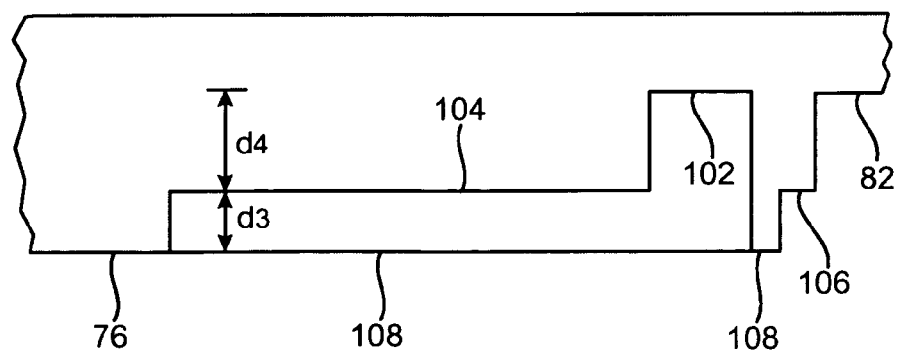
FIG. 10 is a cross sectional view of the side air-bearing pads depicted in FIG. 9, taken along the direction IX-IX.

FIG. 10 is a cross sectional view of the side air-bearing pad 90 depicted in FIG. 9, taken along the direction IX-IX. As illustrated, the seventh surface constituent 104 and the first surface constituent 78 including its tail 106 are formed at the second surface level, while the sixth surface constituent 102 and the second surface constituent 82 are formed at the third surface level. The sixth surface constituent 102 and the tail 108 form a step for generating high positive pressure and thereby increasing the air-bearing stiffness of the slider 69.

TABLE 1

Dynamic characteristics of various magnetic head sliders

|  | Typical | FIG. 3 | FIG. 6 |
|---|---|---|---|
| Flying height (nm) | 9 | 9 | 9 |
| Pitch angle (μR) | 160 | 160 | 160 |
| Compensation for 4 nm throw (%) | 40 | 10 | 7 |
| Flying height loss at 10,000 FT (nm) | −0.5 | −0.3 | −0.4 |
| Flying height sigma (nm) | 0.88 | .95 | .9 |

Table 1 shows dynamic characteristics of sliders having various air-bearing surface configurations under an exemplary operational condition. The first column corresponds to a typical magnetic head slider without separation of the load-carrying part from the head mounting part. The second and third columns respectively correspond to the first and second embodiments illustrated in FIGS. 3 and 6, wherein each of these embodiments includes a load-carrying part separated from a head mounting part. The second and third rows represent a set of operational conditions. The fourth row represents the protrusion compensation for a protrusion throw of 4 nm. A typical configuration has 40% or more protrusion compensation meaning that, for each nanometer of protrusion throw, the flying height is reduced by 0.4 nm. In contrast, the first and second embodiments respectively have 10% and 7% protrusion compensations. Apparently, the reduction in compensation is obtained by separating the load-carrying part from the head mounting part.

The fifth row shows the flying height loss due to a drop in atmospheric pressure during operation at the altitude of 10,000 ft. As can be noticed, the altitude sensitivity or loss at 10,000 ft is well preserved for both embodiments. In fact, the second embodiment has an improved response to the pressure change. Also, as shown in the sixth row, the flying height sigma is well preserved for both embodiments.

It should be understood, of course, that the foregoing relates to exemplary embodiments of the invention and that modifications may be made without departing from the spirit and scope of the invention as set forth in the following claims.

What is claimed is:

1. A magnetic head slider configured to move over a magnetic disk to write data thereto and read data therefrom, the disk being capable of generating an air flow between the disk and the slider during operation, the magnetic head slider comprising:

at least one front pad formed on an upstream portion of the slider and operative to generate a lifting force by use of the air flow;

a rear pad located downstream of said front pad and along a longitudinal axis of the slider and including a load-carrying part for generating a lifting force by use of the air flow and a head mounting part that is separated from said load-carrying part by a groove formed therebetween, said load-carrying part having a transverse width of a first dimension and a downstream edge including a concave portion facing said head mounting part and defining one side of said groove, said head mounting part having a transverse width of a second dimension substantially smaller than said first dimension and including a heat source for generating heat energy in said head mounting part to cause a protrusive deformation of said head mounting part in the direction of the disk, and wherein said groove tends to thermally isolate said head mounting part from said load-carrying part and prevent said heat energy from deforming said load-carrying part.

2. A magnetic head slider as recited in claim 1, wherein said head mounting part has a shape elongated in a direction transverse to the longitudinal axis.

3. A magnetic head slider as recited in claim 2, wherein said head mounting part has a length of about 25 μm and a width of about 70 μm in the transverse direction.

4. A magnetic head slider as recited in claim 1, wherein a trailing edge of said head mounting part is shaped to have a level approximately matching an outer boundary of a footprint of protrusion throw.

5. A magnetic head slider as recited in claim 1, further including:

a first surface constituent adjacent said front pad and operative to compress the air flow; and a second surface constituent adjacent said first surface constituent and operative to generate a sub-atmospheric pressure thereon, wherein said front and rear pads are formed at a first surface level, said first surface constituent is formed at a second surface level, and said second surface constituent and said groove are formed at a third surface level and wherein said first, second, and third surface levels are formed sequentially from an adjacent side to said magnetic disk.

6. A magnetic head slider as recited in claim 5, wherein the depth from the first surface level to the second surface level ranges from 0.05 to 0.5 μm, and the depth from the second surface level to the third surface level ranges from 0.5 to 5 μm.

7. A magnetic head slider as recited in claim 5, wherein said front pad includes two side parts respectively located on opposite sides of the longitudinal axis.

8. A magnetic head slider as recited in claim 5, further comprising:

a pair of side air-bearing pads respectively located on opposite sides of the longitudinal axis and adapted to increase air-bearing stiffness of said slider, each said side air-bearing pad including:

a third surface constituent having a generally rectangular shape;

a fourth surface constituent having a substantially polygonal shape with an elongated portion, a tip of said elongated portion being in contact with said third surface constituent;

a fifth surface constituent partially surrounding said third and fourth surface constituents and forming a tail of said frond pad; and a sixth surface constituent partially surrounding said
fifth surface constituent and forming a tail of said first
surface constituent,
wherein said third surface constituent is formed at said
third surface level and said fourth surface constituent is
formed at said second surface level.

9. A magnetic head slider as recited in claim 1, wherein said
head mounting part further includes a head for writing data to
and for reading data from the disk.

10. A magnetic head slider configured to move over a
magnetic disk to write data thereto and read data therefrom,
the disk being capable of generating an air flow between the
disk and the slider during operation, the magnetic head slider
comprising:
at least one front pad formed on an upstream portion of the
slider and operative to generate a lifting force by use of
the air flow;
a rear pad located downstream of said front pad and along
a longitudinal axis of the slider and including a load-
carrying part for generating a lifting force by use of the
air flow and a head mounting part that is separated from
said load-carrying part by a groove formed therebe-
tween, said load-carrying part having a transverse width
of a first dimension and a downstream edge including a
concave portion facing said head mounting part and
defining one side of said groove, said head mounting
part having a transverse width of a second dimension
substantially smaller than said first dimension and
including a heat source for generating heat energy in said
head mounting part to cause a protrusive deformation of
said head mounting part in the direction of the disk and
wherein said groove tends to thermally isolate said head
mounting part from said load-carrying part and suppress
formation of a protrusion throw on said load-carrying
part;
a first surface constituent adjacent said front pad and opera-
tive to compress the air flow;
a second surface constituent adjacent said first surface
constituent and operative to generate a sub-atmospheric
pressure thereon, wherein said front and rear pads are
formed at a first surface level, said first surface constitu-
ent is formed at a second surface level, and said second
surface constituent and said groove are formed at a third
surface level and wherein said first, second, and third
surface levels are formed sequentially from an adjacent
side to said magnetic disk; and
a pair of side air-bearing pads respectively located on oppo-
site sides of the longitudinal axis and adapted to increase
air-bearing stiffness of said slider, each said side air-
bearing pad including:
a third surface constituent having a generally rectangu-
lar shape;
a fourth surface constituent having a substantially
polygonal shape with an elongated portion, a tip of
said elongated portion being in contact with said third
surface constituent;
a fifth surface constituent partially surrounding said
third and fourth surface constituents and forming a
tail of said frond pad; and
a sixth surface constituent partially surrounding said
fifth surface constituent and forming a tail of said first
surface constituent,
wherein said third surface constituent is formed at said
third surface level and said fourth surface constituent
is formed at said second surface level.

11. A magnetic head slider as recited in claim 10, wherein
said head mounting part further includes a head for writing
data to and for reading data from the disk.

12. A magnetic head slider configured to move over a
magnetic disk to write data thereto and read data therefrom,
the disk being capable of generating an air flow between the
disk and the slider during operation, the magnetic head slider
comprising:
two front pads respectively located on opposite sides of a
longitudinal axis and operative to generate a lifting force
by use of the air flow;
a rear pad located downstream of said front pad and along
a longitudinal axis of the slider and including a load-
carrying part for generating a lifting force by use of the
air flow and a head mounting part that is separated from
said load-carrying part by a groove formed therebe-
tween, said load-carrying part having a transverse width
of a first dimension and a downstream edge including a
concave portion facing said head mounting part and
defining one side of said groove, said head mounting
part having a transverse width of a second dimension
substantially smaller than said first dimension and
including a heat source for generating heat energy in said
head mounting part to cause a protrusive deformation of
said head mounting part in the direction of the disk and
wherein said groove tends to thermally isolate said head
mounting part from said load-carrying part and suppress
formation of a protrusion throw on said load-carrying
part;
a first surface constituent adjacent said front pads and
operative to compress the air flow; and
a second surface constituent adjacent said first surface
constituent and operative to generate a sub-atmospheric
pressure thereon, wherein said front and rear pads are
formed at a first surface level, said first surface constitu-
ent is formed at a second surface level, and said second
surface constituent and said groove are formed at a third
surface level and wherein said first, second, and third
surface levels are formed sequentially from an adjacent
side to said magnetic disk.

13. A magnetic head slider as recited in claim 12, wherein
said head mounting part further includes a head for writing
data to and for reading data from the disk.

* * * * *